(12) United States Patent
Jiang et al.

(10) Patent No.: US 12,384,209 B2
(45) Date of Patent: Aug. 12, 2025

(54) VERTICAL TIRE CHANGER WITH DOUBLE-SIDED TOOL AND OVERTURNING STRUCTURE

(71) Applicants: YINGKOU LIAONAN DEVI MACHINERY EQUIPMENT CO., LTD, Liaoning (CN); Aston Technologies Inc., Chantilly, VA (US)

(72) Inventors: Guilin Jiang, Liaoning (CN); Yiming Jiang, Liaoning (CN)

(73) Assignees: YINGKOU LIAONAN DEVI MACHINERY EQUIPMENT CO., LTD, Liaoning (CN); ASTON TECHNOLOGIES INC., Chantilly, VA (US)

( * ) Notice: Subject to any disclaimer, the term of this patent is extended or adjusted under 35 U.S.C. 154(b) by 336 days.

(21) Appl. No.: 18/187,905

(22) Filed: Mar. 22, 2023

(65) Prior Publication Data
US 2023/0398820 A1    Dec. 14, 2023

(30) Foreign Application Priority Data
Jun. 9, 2022    (CN) .......................... 202210649163.7

(51) Int. Cl.
*B60C 25/138*    (2006.01)
*B60C 25/05*    (2006.01)

(52) U.S. Cl.
CPC ........ *B60C 25/138* (2013.01); *B60C 25/0539* (2013.01); *B60C 25/0545* (2013.01)

(58) Field of Classification Search
CPC ............ B60C 25/0539; B60C 25/0545; B60C 25/0563; B60C 25/0593; B60C 25/132; B60C 25/135; B60C 25/138
See application file for complete search history.

(56) References Cited

U.S. PATENT DOCUMENTS

| 8,376,018 B2 * | 2/2013 | Corghi ................ B60C 25/0545 157/16 |
| 8,783,326 B1 * | 7/2014 | Vaninger ............. B60C 25/0551 157/1.24 |
| 9,067,467 B2 * | 6/2015 | Corghi ................ B60C 25/0506 |

(Continued)

FOREIGN PATENT DOCUMENTS

EP    3741591 A1 *   11/2020    ......... B60C 25/0518

*Primary Examiner* — David B. Thomas
(74) *Attorney, Agent, or Firm* — Alston & Bird LLP (57) ABSTRACT

A vertical tire changer with a double-sided tool and an overturning structure is provided. The vertical tire changer includes a pedal, a base, an operating platform, a pulley, a double-sided tool rotating structure, a small pressing wheel structure, a large pressing wheel structure, a lifting seat and a rotating chuck. A wheel hub is clamped above the rotating chuck so that the rotating chuck rotates to a horizontal position. The ends of the double-sided tool rotating structure are provided with a straight hook portion and a bent hook portion respectively. The straight hook portion is configured for tire mounting, and the bent hook portion is configured for tire dismounting. The small pressing wheel structure and the large pressing wheel structure can both be contracted and extended in the using process. The small pressing wheel structure and the large pressing wheel structure play an auxiliary supporting role.

7 Claims, 6 Drawing Sheets

(56) References Cited

U.S. PATENT DOCUMENTS

| | | | |
|---|---|---|---|
| 9,073,394 B1 * | 7/2015 | Clasquin | B60C 25/056 |
| 11,254,174 B2 * | 2/2022 | Gonzaga | B60C 25/138 |
| 11,712,932 B2 * | 8/2023 | Gonzaga | B60C 25/0548 |
| | | | 157/1.1 |
| 12,172,474 B2 * | 12/2024 | Pellacani | B60C 25/059 |
| 2014/0283590 A1 * | 9/2014 | Sotgiu | B60C 25/056 |
| | | | 73/146 |
| 2016/0089940 A1 * | 3/2016 | Zhang | B60C 25/0506 |
| | | | 29/434 |
| 2016/0288598 A1 * | 10/2016 | Bonacini | B60C 25/0548 |
| 2018/0126807 A1 * | 5/2018 | Corghi | B60C 25/0515 |
| 2020/0189333 A1 * | 6/2020 | Corghi | G01M 17/022 |
| 2023/0118720 A1 * | 4/2023 | Corghi | B60C 25/059 |
| | | | 157/1.24 |
| 2023/0123205 A1 * | 4/2023 | Corghi | B60C 25/059 |
| | | | 157/1.24 |

* cited by examiner

VERTICAL TIRE CHANGER WITH DOUBLE-SIDED TOOL AND OVERTURNING STRUCTURE

CROSS-REFERENCE TO RELATED APPLICATION

This patent application claims the benefit and priority of Chinese Patent Application No. 202210649163.7 filed with the China National Intellectual Property Administration on Jun. 9, 2022, the disclosure of which is incorporated by reference herein in its entirety as part of the present application.

BACKGROUND

Related Field

The present disclosure relates to the technical field of tire mounting and dismounting, in particular to a vertical tire changer with a double-sided tool and an overturning structure.

Related Art

Particularly, in the international market, the tire changer has come into families and is a necessary household appliance for families. Almost each of families in the foreign countries has not only a small automobile but also a large automobile.

Due to the fact that various steel wire tires, explosion-proof tires and special wheel hubs appear along with the development of the automobile industry, a traditional pneumatic tire changer cannot meet the use requirement of various tires.

BRIEF SUMMARY

The present disclosure aims to provide a vertical tire changer with a double-sided tool and an overturning structure and solves the technical problem that a traditional pneumatic tire changer cannot meet the use requirements of various tires due to the occurrence of various steel wire tires, explosion-proof tires and special wheel hubs along with the development of the automobile industry.

In order to achieve the above-mentioned purpose, the present disclosure provides a vertical tire changer with a double-sided tool and an overturning structure. The vertical tire changer includes a pedal, a base, an operating platform, a sliding body, a double-sided tool rotating structure, a small pressing wheel structure, a large pressing wheel structure, a lifting seat and a rotating chuck. The operating platform is arranged on a first side of the base. The pedal is arranged beneath the operating platform. The sliding body is arranged above the base. The lifting seat is arranged above the base. The sliding body is arranged on one side of the lifting seat. The double-sided tool rotating structure is mounted on one side of the sliding body. The small pressing wheel structure and the large pressing wheel structure are mounted on an other side of the sliding body. The small pressing wheel structure is located above the large pressing wheel structure. The rotating chuck is arranged on a second side of the base, and the pedal is configured for controlling the rotating chuck.

In some embodiments, a first mounting hole may be formed in the one side of the sliding body, and a second mounting hole and a third mounting hole may be formed in the other side of the sliding body.

In some embodiments, the double-sided tool rotating structure may include a first rod body, a cylinder lug, a pin seat, a handball, a locking pin shaft, a double-sided tool and a pin. The first rod body may be mounted on the one side of the sliding body through the first mounting hole. The pin seat may be arranged at one end of the first rod body. The locking pin shaft may be arranged inside the pin seat. The handball may be arranged on a top of the locking pin shaft, and the pin may be arranged between the pin seat and the first rod body.

In some embodiments, the double-sided tool may include a rotating shaft, set screws, a tool head and a hexagon socket head cap screw. The rotating shaft may be arranged inside the pin seat. The tool head may be detachably connected with the rotating shaft through the hexagon socket head cap screw, and the set screws may be arranged between the tool head and the rotating shaft.

In some embodiments, the double-sided tool further may include a first gasket and a second gasket, and the first gasket and the second gasket may be arranged at two ends of the tool head respectively.

In some embodiments, the small pressing wheel structure may include a nylon wheel and a pressing rod. One end of the pressing rod may be mounted on the one side of the sliding body through the second mounting hole, and the nylon wheel may be mounted at an other end of the pressing rod.

In some embodiments, the lifting seat may include a slideway and a cylinder rod. The slideway may be fixedly connected with the base and located above the base. The sliding body may be slidably connected with the slideway and located on one side of the slideway. The cylinder rod may be arranged on an other side of the slideway, and the cylinder rod may be connected with the sliding body.

According to the vertical tire changer with a double-sided tool and an overturning structure provided by the present embodiment, a wheel hub is clamped above the rotating chuck so that the rotating chuck rotates to a horizontal position. The ends of the double-sided tool rotating structure are provided with a straight hook portion and a bent hook portion respectively. The straight hook portion is configured for tire mounting, and the bent hook portion is configured for tire dismounting. The small pressing wheel structure and the large pressing wheel structure can both be contracted and extended in the using process. The small pressing wheel structure and the large pressing wheel structure play an auxiliary supporting role. The rotation of the wheel hub is achieved through the rotating chuck. The lifting seat is pressed downwards, so that tire mounting or tire dismounting is completed. The speeds of both the tire mounting and the tire dismounting are increased, the types of tires that are mounted and dismounted are increased. Thus, this vertical tire changer can be dual-purpose, so the equipment cost is saved, and damages to wheel hubs and tires are reduced.

BRIEF DESCRIPTION OF THE DRAWINGS

In order to more clearly illustrate the technical solutions of the present disclosure or the prior art, the drawings, which need to be used in the embodiments or the prior art description, are briefly described below.

DETAILED DESCRIPTION OF VARIOUS EMBODIMENTS

Embodiments of the present disclosure are described in detail below, and examples of the embodiments are illustrated in the attached figures. The embodiments described below by reference to the attached figures are exemplary only for explaining the present disclosure and are not to be construed as limiting the present disclosure.

List of the reference characters: 1 pedal; 2 base; 3 operating platform; 4 sliding body; 5 double-sided tool rotating structure; 6 small pressing wheel structure; 7 large pressing wheel structure; 8 rotating chuck; 9 first mounting hole; 10 second mounting hole; 11 third mounting hole; 12 first rod body; 13 cylinder lug; 14 pin seat; 15 handball; 16 locking pin shaft; 17 double-sided tool; 18 pin; 19 rotating shaft; 20 set screw; 21 tool head; 22 hexagon socket head cap screw; 23 nylon wheel; 24 pressing rod; 25 slideway; 26 cylinder rod; 27 pushing arm; 28 rotating seat; 29 fixed mount; 30 driving motor; 31 rotating disc; 32 clamping jaw; 33 second cylinder; 34 ejector rod; 35 first rotating rod; 36 seat body; 37 second rotating rod; 38 frame body; 39 fixed rod; 40 first gasket; and 41 second gasket.

Figure 1:
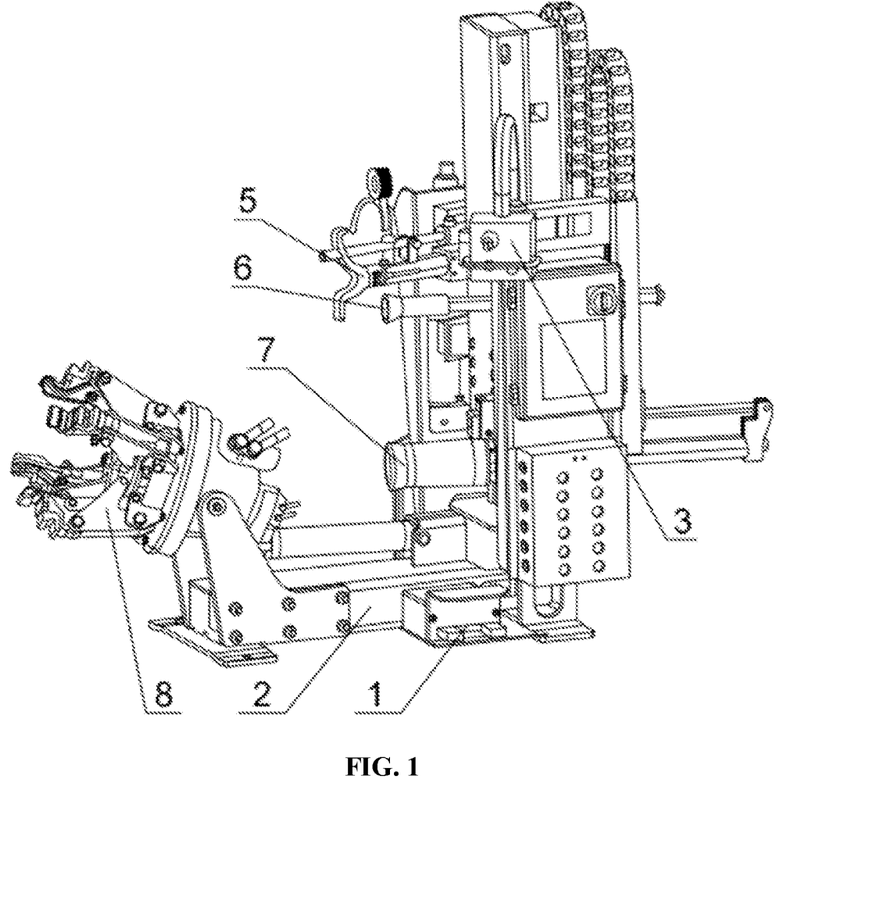
FIG. 1 is a schematic diagram of an integral structure of a vertical tire changer with a double-sided tool and an overturning structure according to embodiments of the present disclosure.
Figure 2:
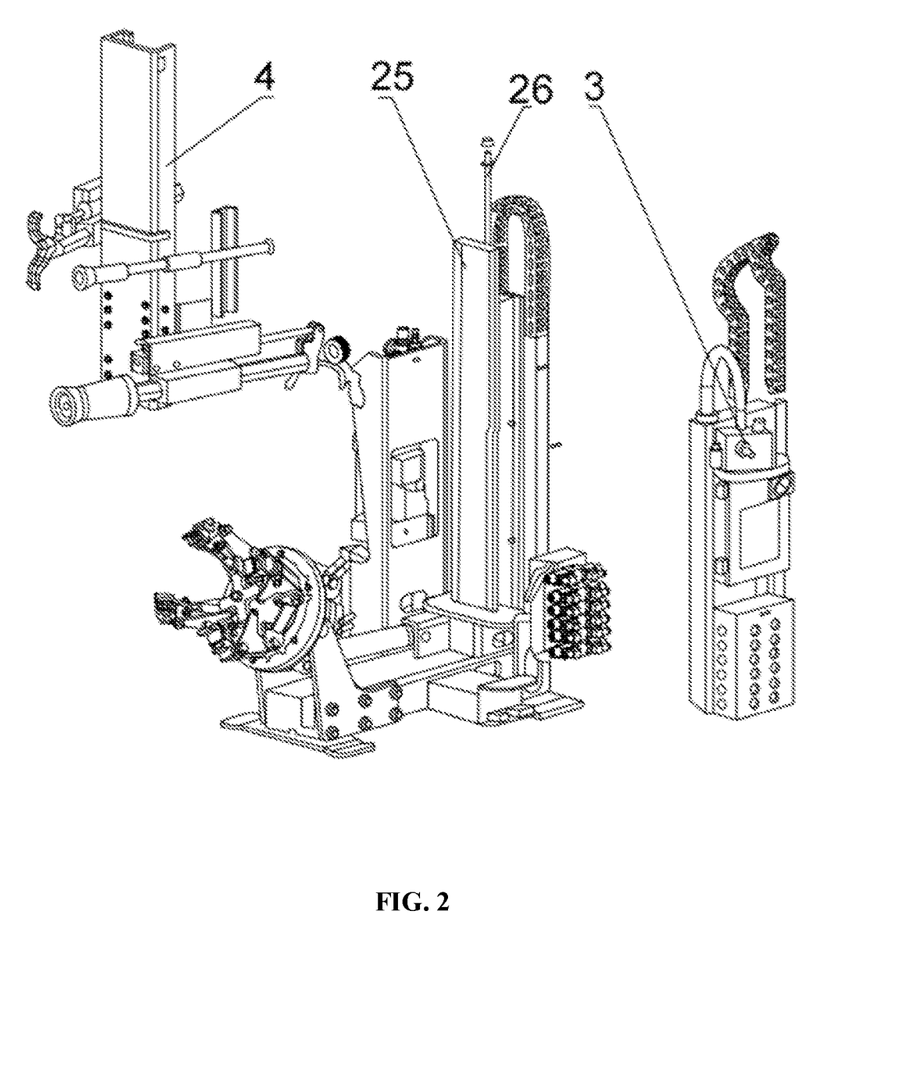
FIG. 2 is a decomposition schematic diagram of a vertical tire changer with a double-sided tool and an overturning structure according to embodiments of the present disclosure.
Figure 3:
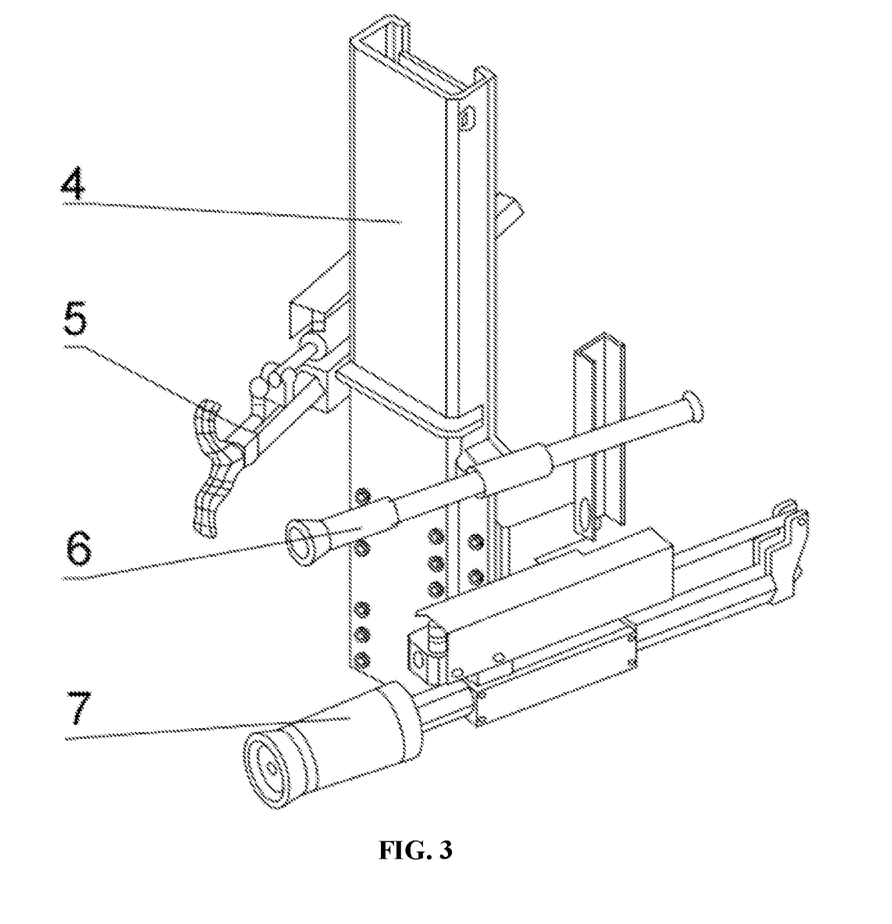
FIG. 3 is a mounting schematic diagram of a sliding body according to embodiments of the present disclosure.

Referring to FIG. 1 to FIG. 3, the present embodiments provide a vertical tire changer with a double-sided tool 17 and an overturning structure. The vertical tire changer includes a pedal 1, a base 2, an operating platform 3, a sliding body 4, a double-sided tool rotating structure 5, a small pressing wheel structure 6, a large pressing wheel structure 7, a lifting seat and a rotating chuck 8. The operating platform 3 is arranged on a first side of the base 2. The pedal 1 is arranged beneath the operating platform 3. The sliding body 4 is arranged above the base 2. The lifting seat is arranged above the base 2. The sliding body 4 is arranged on one side of the lifting seat. The double-sided tool rotating structure 5 is mounted on one side of the sliding body 4. The small pressing wheel structure 6 and the large pressing wheel structure 7 are mounted on an other side of the sliding body 4. The small pressing wheel structure 6 is located above the large pressing wheel structure 7. The rotating chuck 8 is arranged on a second side of the base 2, and the pedal 1 is configured for controlling the rotating chuck 8.

In the embodiment, a wheel hub is clamped above the rotating chuck 8 so that the rotating chuck 8 rotates to a horizontal position. The two ends of the double-sided tool rotating structure 5 are provided with a straight hook portion and a bent hook portion respectively. The straight hook portion is configured for tire mounting, and the bent hook portion is configured for tire dismounting. The small pressing wheel structure 6 and the large pressing wheel structure 7 can both be contracted and extended in the using process. The small pressing wheel structure 6 and the large pressing wheel structure 7 play an auxiliary supporting role. The rotation of the wheel hub is achieved through the rotating chuck 8. The lifting seat is pressed downwards, so that tire mounting or tire dismounting is completed. The speeds of both the tire mounting and dismounting are increased, the types of tires that are mounted and dismounted are increased. Thus, this vertical tire changer can be dual-purpose, so the equipment cost is saved, and damages to wheel hubs and tires are reduced.

Figure 4:
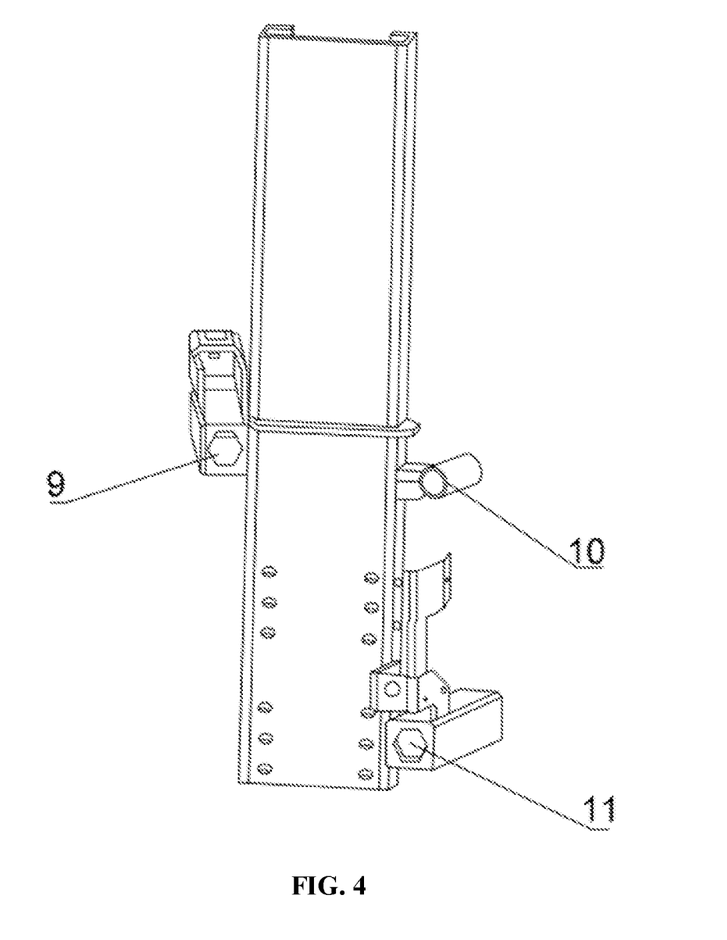
FIG. 4 is a schematic structural diagram of a sliding body according to embodiments of the present disclosure.

A first mounting hole 9 is formed in the one side of the sliding body 4, and a second mounting hole 10 and a third mounting hole 11 are formed in the other side of the sliding body 4.

In the embodiment, the first mounting hole 9 is configured for mounting the double-sided tool rotating structure 5, the second mounting hole 10 is configured for mounting the small pressing wheel structure 6, and the third mounting hole 11 is configured for mounting the large pressing wheel structure 7.

Figure 5:
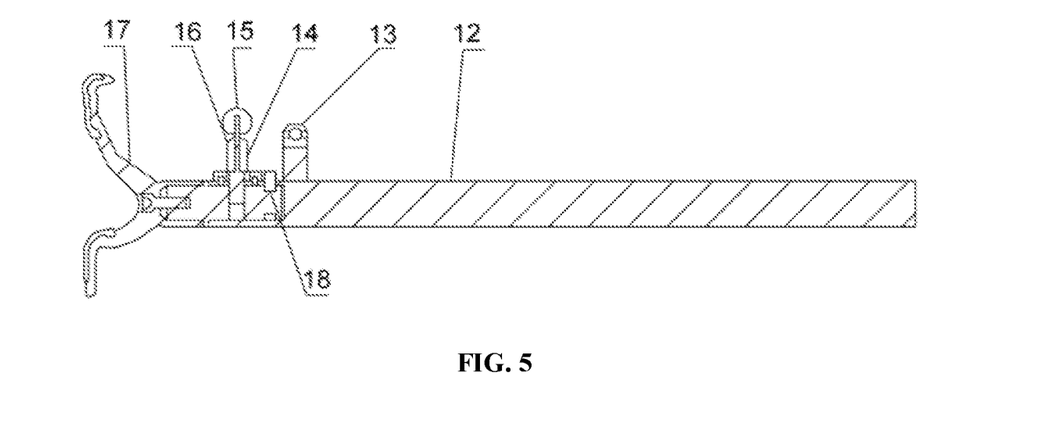
FIG. 5 is a section view of a double-sided tool rotating structure according to embodiments of the present disclosure.
Figure 6:
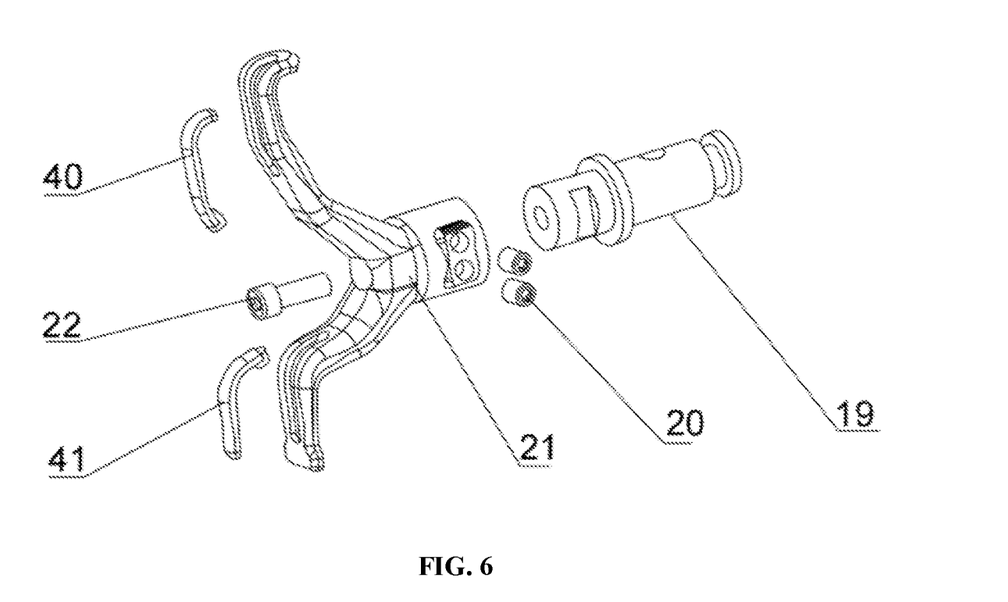
FIG. 6 is an explosive view of a double-sided tool according to embodiments of the present disclosure.
Figure 7:
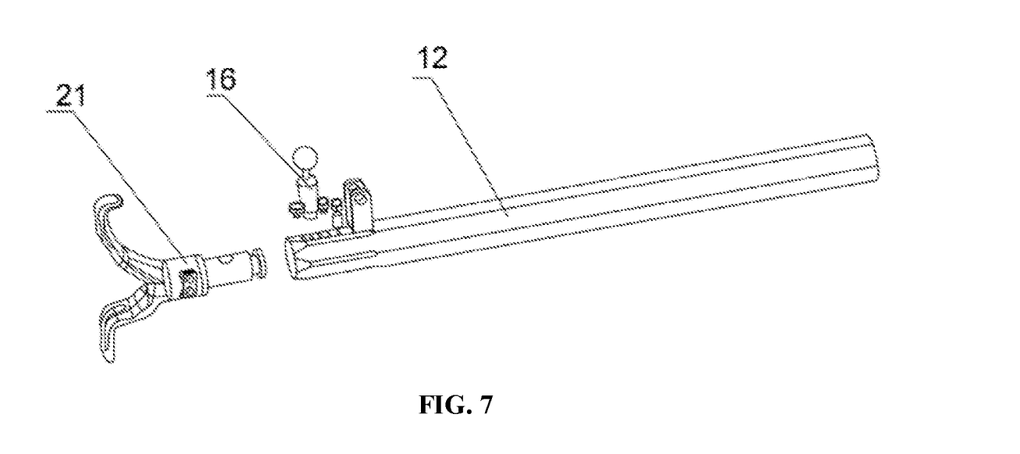
FIG. 7 is a decomposition schematic diagram of a double-sided tool rotating structure according to embodiments of the present disclosure.

The double-sided tool rotating structure 5 includes a first rod body 12, a cylinder lug 13, a pin seat 14, a handball 15, a locking pin shaft 16, a double-sided tool 17 and a pin 18. The first rod body 12 is mounted on the one side of the sliding body 4 through the first mounting hole 9. The pin seat 14 is arranged at one end of the first rod body 12. The locking pin shaft 16 is arranged inside the pin seat 14. The handball 15 is arranged on a top of the locking pin shaft 16, and the pin 18 is arranged between the pin seat 14 and the first rod body 12. The double-sided tool 17 includes a rotating shaft 19, set screws 20, a tool head 21 and a hexagon socket head cap screw 22. The rotating shaft 19 is arranged inside the pin seat 14. The tool head 21 is detachably connected with the rotating shaft 19 through the hexagon socket head cap screw 22, and the set screws 20 are arranged between the tool head 21 and the rotating shaft 19. The double-sided tool 17 further includes a first gasket 40 and a second gasket 41, and the first gasket 40 and the second gasket 41 are arranged at the two ends of the tool head 21 respectively.

In the embodiment, the rotation of the rotating shaft 19 is limited through the handball 15 and the locking pin shaft 16. One end of the tool head 21 is a bent hook portion, and the other end of the tool head 21 is a straight hook portion. A cylinder is arranged in the sliding body 4, so that the first rod body 12 is controlled to stretch and retract along the first mounting hole 9.

Figure 8:
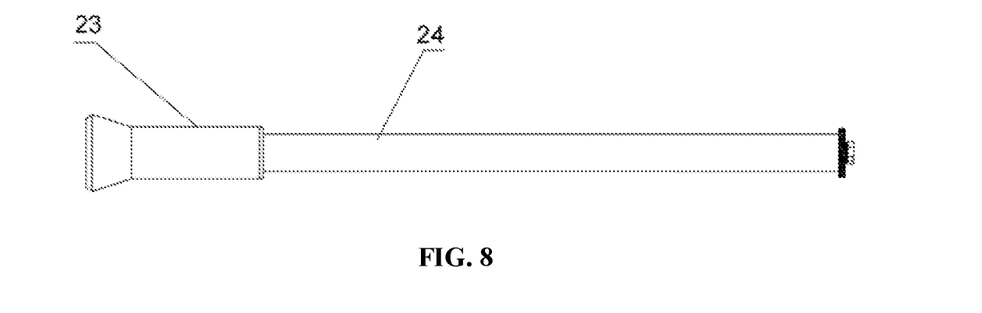
FIG. 8 is a schematic structural diagram of a small pressing wheel structure according to embodiments of the present disclosure.

The small pressing wheel structure 6 includes a nylon wheel 23 and a pressing rod 24. One end of the pressing rod 24 is mounted on one side of the sliding body 4 through the second mounting hole 10, and the nylon wheel 23 is mounted at the other end of the pressing rod 24.

In the embodiment, by arranging the nylon wheel 23, the friction between the nylon wheel 23 and the tire is increased, and the tie is convenient to be dismounted or mounted.

The lifting seat includes a slideway 25 and a cylinder rod 26. The slideway 25 is fixedly connected with the base 2 and located above the base 2. The sliding body 4 is slidably connected with the slideway 25 and located on one side of the slideway. The cylinder rod 26 is arranged on the other side of the slideway 25, and the cylinder rod 26 is connected with the sliding body 4.

In the embodiment, the cylinder rod 26 pushes the sliding body 4 to move up and down along the slideway 25, so that the positions of the double-sided tool rotating structure 5, the small pressing wheel structure 6 and the large pressing wheel structure 7 are controlled.

Figure 9:
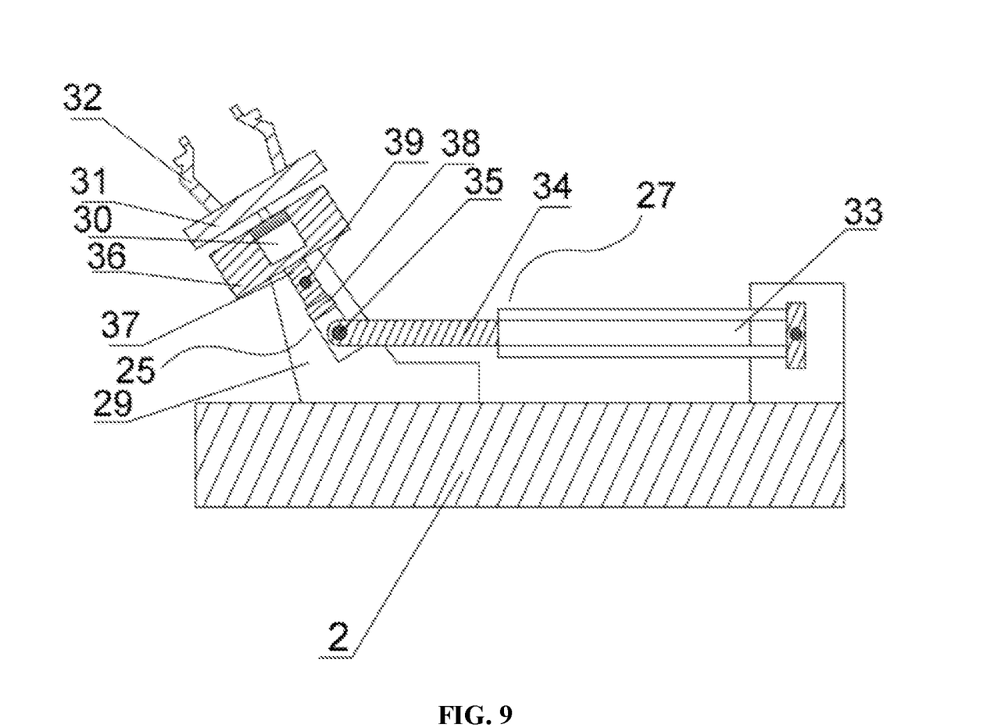
FIG. 9 is a section view of a rotating chuck according to embodiments of the present disclosure.

The rotating chuck 8 includes a pushing arm 27, a rotating seat 28, a fixed mount 29, a driving motor 30, a rotating disc 31 and clamping jaws 32. The pushing arm 27 is rotatably connected with the base 2 and located above the base 2. The fixed mount 29 is arranged on one side of the base 2. The rotating seat 28 is rotatably connected with the fixed mount 29 and located in the fixed mount 29. The output end of the pushing arm 27 is hinged to the rotating seat 28. The driving motor 30 is arranged in the rotating seat 28. The rotating disc 31 is arranged at the output end of the driving motor 30, and the clamping jaws 32 are arranged above the rotating disc 31.

In the embodiment, during clamping, the rotating disc 31 is obliquely arranged so that the wheel hub is convenient to be clamped. The clamping jaws 32 are configured for clamping the wheel hub. After clamping is completed, the pushing arm 27 pushes the rotating seat 28, so that the rotating seat 28 is overturned upwards, and the rotating disc 31 and the wheel hub are kept horizontal. The driving motor 30 drives the clamping jaws 32 to rotate, so that the wheel hub rotates, and tire dismounting or tire dismounting is completed.

The pushing arm 27 includes a second cylinder 33, an ejector rod 34 and a first rotating rod 35. The bottom of the second cylinder 33 is rotatably connected with the base 2. The ejector rod 34 is arranged at the output end of the second cylinder 33, and the first rotating rod 35 is rotatably connected with the ejector rod 34 and located at the end, away from the second cylinder 33, of the ejector rod 34.

In the embodiment, the second cylinder 33 pushes the ejector rod 34 to move. In the moving process of the ejector rod 34, due to the fact that the first rotating rod 35 is fixedly connected with the rotating seat 28, the rotating seat 28 is overturned. Therefore, the inclination angle of the rotating seat 28 is adjusted.

The rotating seat 28 includes a seat body 36, a second rotating rod 37, a frame body 38 and a fixed rod 39. The two ends of the fixed rod 39 are fixedly connected with the fixed mount 29. The second rotating rod 37 is rotatably connected with the fixed rod 39. One end of the second rotating rod 37 is fixedly connected with the seat body 36, and the other end of the second rotating rod 37 is fixedly connected with the frame body 38. The frame body 38 is connected with the first rotating rod 35.

In the embodiment, the second cylinder 33 pushes the ejector rod 34 to move, and the frame body 38 rotates along with the first rotating rod 35, so that the second rotating rod 37 rotates around the fixed rod 39, and thus the seat body 36 rotates.

When the vertical tire changer with a double-sided tool 17 and an overturning structure in the embodiment is used, the wheel hub is clamped above the rotating chuck 8, and the rotating chuck 8 rotates to the horizontal position. A switch on the operating platform 3 is started for mounting or dismounting the tire. When the tire is mounted, the straight hook portion of the double-sided tool rotating structure 5 is located below the bent hook portion of the double-sided tool rotating structure 5. The operating platform 3 is configured for controlling the straight hook portion to walk to the position above a tire bead. Meanwhile, the small pressing wheel structure 6 is stretched to the position above the tire bead, and then the lifting seat is controlled to move downwards. In the process that the lifting seat moves downwards, the rotating chuck 8 drives the wheel hub to rotate by one circle to complete the mounting of a first crossing. The wheel hub continues to rotate downwards by one circle in the same method to complete the mounting of a second crossing. When the tire is dismounted, the small pressing wheel structure 6 is retracted, and the handball 15 is pulled upwards, so that the tool head 21 can freely rotate by 180°, and the bent hook portion is located below the straight hook portion. After the handball 15 is loosened, the locking pin shaft 16 falls into a round hole to achieve locking, and the bent hook portion hooks the tire. The rotating chuck 8 drives the wheel hub to rotate by one circle to complete the dismounting of the first crossing. Then, the large pressing wheel structure 7 walks to the edge of the wheel hub, the wheel hub rotates again, the tire is cut out of the edge of the wheel hub, and tire dismounting is completed.

What is disclosed above is merely example embodiments of the present disclosure, and certainly is not intended to limit the protection scope of the present disclosure. Those skilled in the art may understand that all or some of processes that implement the foregoing embodiments and equivalent modifications made in accordance with the claims of the present disclosure shall fall within the scope of the present disclosure.

What is claimed is:

1. A vertical tire changer with a double-sided tool and an overturning structure, comprising a pedal, a base and an operating platform, the operating platform being arranged on a first side of the base, and the pedal being arranged beneath the operating platform, wherein
the vertical tire changer further comprises a sliding body, a double-sided tool rotating structure, a small pressing wheel structure, a large pressing wheel structure, a lifting seat and a rotating chuck, the sliding body is arranged above the base, the lifting seat is arranged above the base, the sliding body is arranged on one side of the lifting seat, the double-sided tool rotating structure is mounted on one side of the sliding body pulley, the small pressing wheel structure and the large pressing wheel structure are mounted on an other side of the sliding body, the small pressing wheel structure is located above the large pressing wheel structure, the rotating chuck is arranged on a second side of the base, and the pedal is configured for controlling the rotating chuck.

2. The vertical tire changer with a double-sided tool and an overturning structure according to claim 1, wherein a first mounting hole is formed in the one side of the sliding body, and a second mounting hole and a third mounting hole are formed in the other side of the sliding body.

3. The vertical tire changer with a double-sided tool and an overturning structure according to claim 2, wherein the double-sided tool rotating structure comprises a first rod body, a cylinder lug, a pin seat, a handball, a locking pin shaft, a double-sided tool and a pin, the first rod body is mounted on the one side of the sliding body through the first mounting hole, the pin seat is arranged at one end of the first rod body, the locking pin shaft is arranged inside the pin seat, the handball is arranged on a top of the locking pin shaft, and the pin is arranged between the pin seat and the first rod body.

4. The vertical tire changer with a double-sided tool and an overturning structure according to claim 3, wherein the double-sided tool comprises a rotating shaft, set screws, a tool head and a hexagon socket head cap screw, the rotating shaft is arranged inside the pin seat, the tool head is detachably connected with the rotating shaft through the hexagon socket head cap screw, and the set screws are arranged between the tool head and the rotating shaft.

5. The vertical tire changer with a double-sided tool and an overturning structure according to claim 4, wherein the double-sided tool further comprises a first insert and a second insert, and the first insert and the second insert are arranged at two ends of the tool head respectively.

6. The vertical tire changer with a double-sided tool and an overturning structure according to claim 5, wherein the small pressing wheel structure comprises a nylon wheel and a pressing rod, one end of the pressing rod is mounted on the one side of the sliding body through the second mounting hole, and the nylon wheel is mounted at an other end of the pressing rod.

7. The vertical tire changer with a double-sided tool and an overturning structure according to claim 6, wherein the lifting seat comprises a slideway and a cylinder rod, the slideway is fixedly connected with the base and located above the base, the sliding body is slidably connected with the slideway and located on one side of the slideway, the cylinder rod is arranged on an other side of the slideway, and the cylinder rod is connected with the sliding body.

\* \* \* \* \*